INVENTOR
CARSTEN J. MUNCH
BY
Zoltan H. Polachek
ATTORNEY

Dec. 1, 1953 C. J. MUNCH 2,661,394

BURGLARY AND FIRE ALARM

Filed Aug. 16, 1951 4 Sheets-Sheet 2

INVENTOR
CARSTEN J. MUNCH
BY
Zoltan Polachek
ATTORNEY

Dec. 1, 1953

C. J. MUNCH 2,661,394

BURGLARY AND FIRE ALARM

Filed Aug. 16, 1951

4 Sheets-Sheet 3

INVENTOR
CARSTEN J. MUNCH

BY Zoltan P. Polachek

ATTORNEY

Dec. 1, 1953 C. J. MUNCH 2,661,394

BURGLARY AND FIRE ALARM

Filed Aug. 16, 1951 4 Sheets-Sheet 4

INVENTOR
CARSTEN J. MUNCH
BY Zoltan Polachek
ATTORNEY

Patented Dec. 1, 1953 2,661,394

UNITED STATES PATENT OFFICE 2,661,394

BURGLARY AND FIRE ALARM

Carsten J. Munch, Bronx, N. Y.

Application August 16, 1951, Serial No. 242,100

5 Claims. (Cl. 179—5)

This invention relates to new and useful improvements in an alarm system.

More specifically, the present invention proposes the construction of an alarm system for connection in a novel manner to the circuits of a conventional telephone to be automatically operated when a predetermined condition exists on the premises protected by the system to establish contact with the central office of the telephone company and advise the telephone operator of the nature of the predetermined condition so that suitable steps can be taken to protect the interests of the telephone subscriber during his absence from the premises.

Another object of the present invention proposes constructing the alarm system so that it is always connected to the telephone so that all the subscriber need do is close a master switch when leaving the premises to condition the alarm system for automatic operation.

Still further, the present invention proposes constructing the alarm system to be connected to the telephone in such a manner as to leave all the circuits of the telephone intact so that the telephone is free to receive in-coming calls and to make out-going calls regardless of whether the alarm system is turned on or not turned on.

The present invention proposes constructing the alarm system to have a plurality of control switches strategically located on the premises which control switches are normally open and arranged to be closed when the predetermined condition exists for which the system has been designed to set the system in operation to achieve its intended purposes.

As a further object, the present invention proposes constructing the alarm system to have its own dial means for automatically dialing the operator after one of the control switches has been closed setting the system in operation to establish contact with the central office independent of any lifting of the telephone hand set or operation of the usual dial mounted on the telephone.

A still further object of the present invention proposes constructing the alarm system to have its own amplifier having a turntable drive motor and amplifying circuit connected in series with a source of current and the master switch in a manner so that the amplifying circuit of the amplifier is energized the moment the master switch is closed to be ready for instantaneous use the moment one of the control switches is closed.

Still further, the present invention proposes arranging the turntable drive motor of the amplifier to be energized to play a continuously recorded message only after dialing of the operator has been completed.

Another object of the present invention proposes connecting the output transformer of the amplifier to the transmitter of the telephone hand set in a manner so that the continuously recorded message will be played to the operator advising her of the predetermined condition for which the system has been set so that the proper action may be taken by the operator.

Still further, the present invention proposes arranging the normally open control switches so that they will be closed by unauthorized opening of a door or window of the protected premises to set the system in operation to advise the telephone operator that the protected premises are being burglarized with the request that the police be dispatched to apprehend the intruder.

As an alternative, the present invention proposes constructing the normally open switches as thermostatic switches which will be closed by excessive raising of the temperature within the protected premises as when a fire breaks out to set the system in operation to advise the telephone operator that the protected premises are on fire with the request that the firemen be dispatched to extinguish the blaze.

It is a further object of the present invention to construct a novel alarm system which can be used to afford protection from unauthorized entrance or fires, which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

On the accompanying drawings forming a material part of this disclosure:

Figure 1:
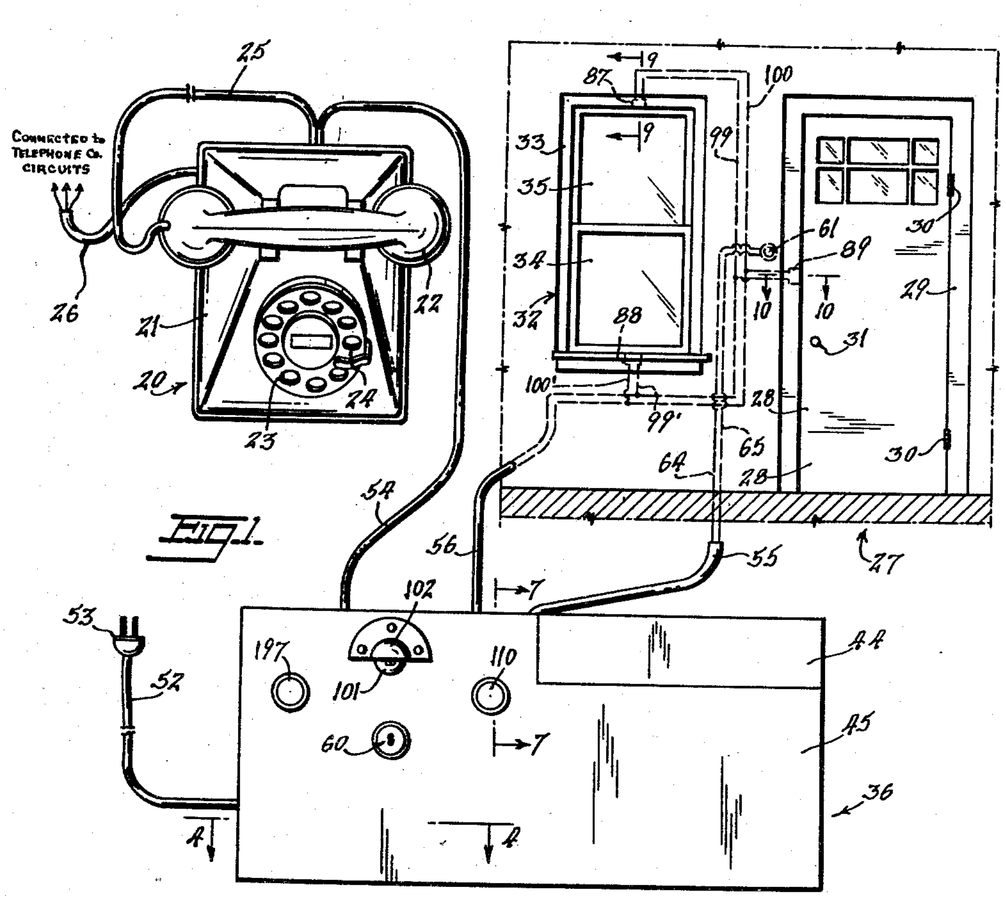
Fig. 1 is a diagrammatic view showing the alarm system of the present invention.
Figures 2, 3:
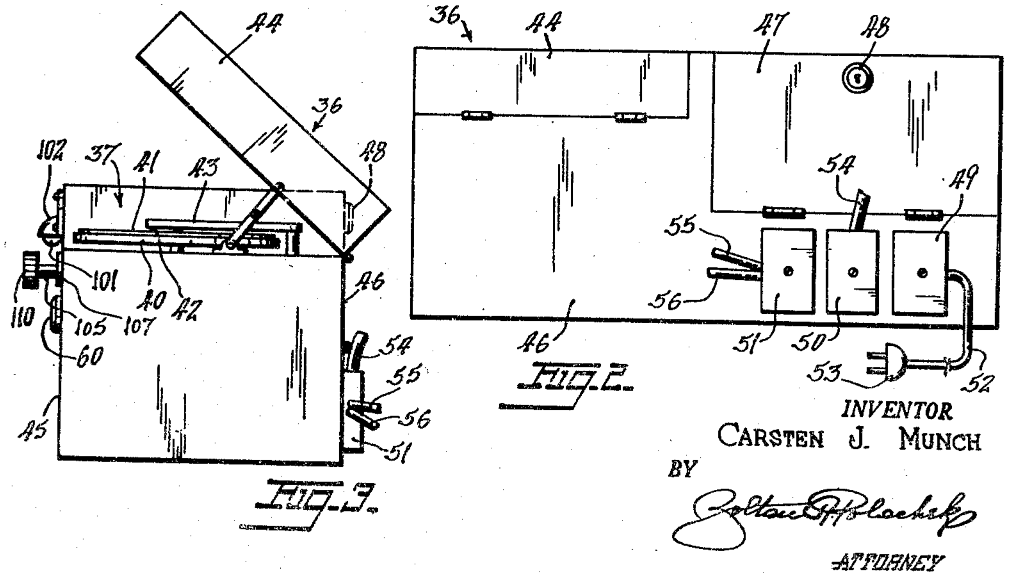
Fig. 2 is a rear elevational view of the main box of the alarm system.
Fig. 3 is an end elevational view of the main box looking from the right side of Fig. 1, but with the cover of the amplifier shown in its open position.
Figure 4:
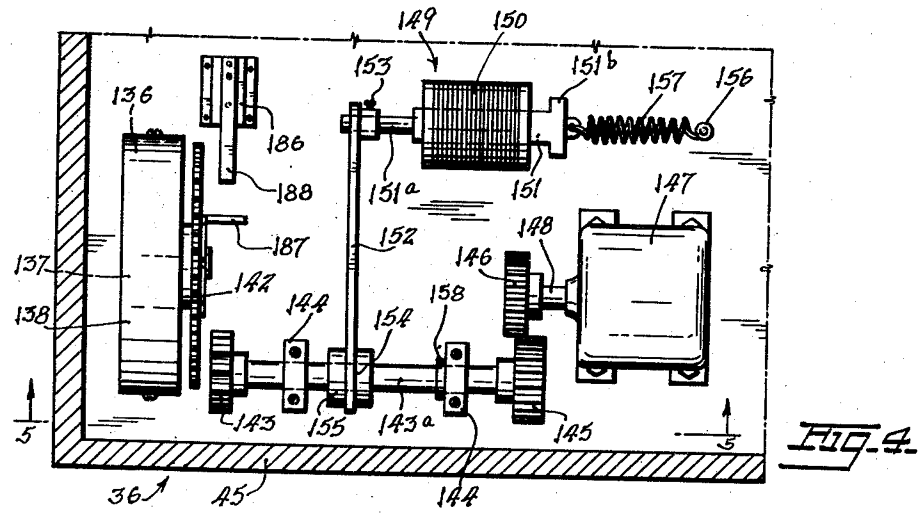
Fig. 4 is a partial enlarged horizontal sectional view taken on the line 4—4 of Fig. 1.
Figures 5, 6:
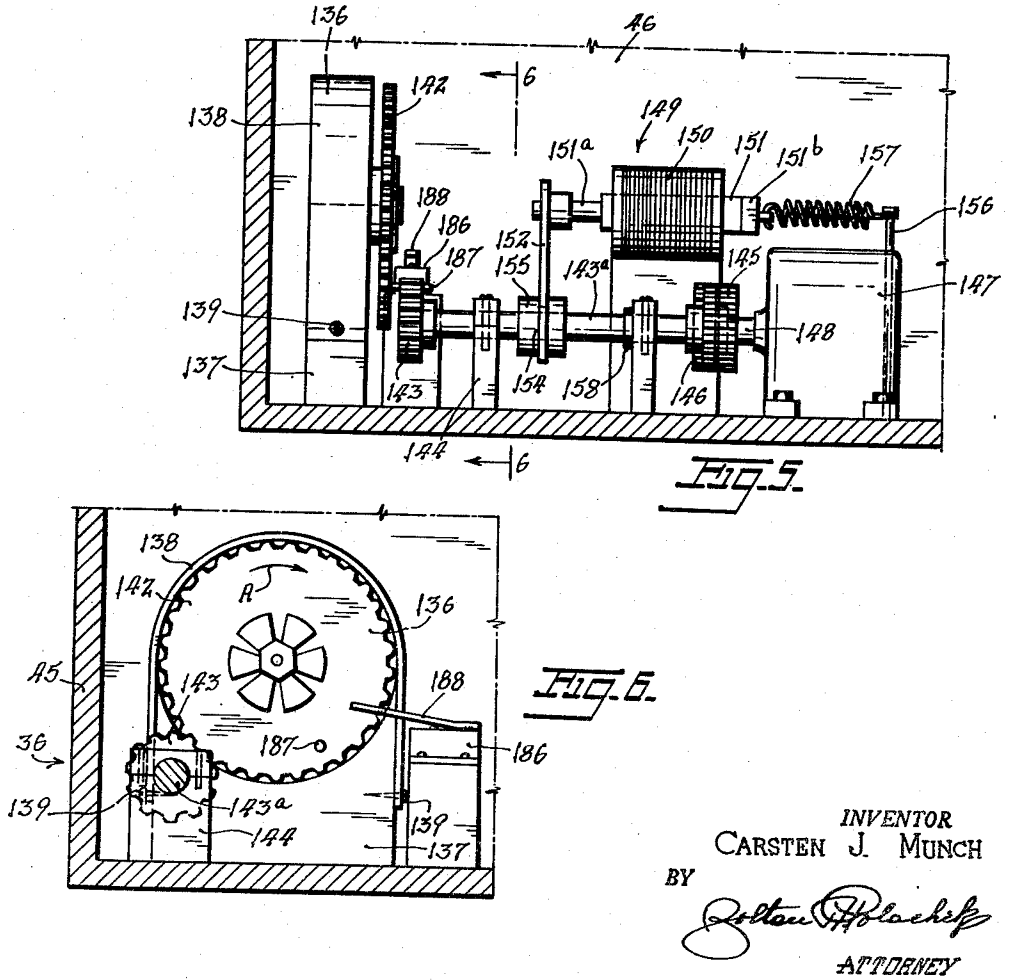
Fig. 5 is a partial vertical sectional view taken on the line 5—5 of Fig. 4.
Fig. 6 is a partial vertical sectional view taken on the line 6—6 of Fig. 5.

The alarm system, according to the first form of the present invention illustrated in Figs. 1 to 11, is designed to be used with a conventional telephone 20 having a base 21 providing a cradle for having the usual hand set 22 rested thereon. On the drawing, the telephone illustrated is known as a type 302 and is manufactured by the Western Electric Company. Resting the hand set 22 in the cradle of the base 21 depresses a pair of plungers, not illustrated, which project upward from the base, to open a switch mounted in the base to break contact with the central office of the telephone company. Thus, the mere act of lifting the hand set 22 permits the switch to reclose and establish contact with the central office all as generally known in the art of telephone circuits.

The base is provided with the usual dialing mechanism 23 operated by a manually rotatable dialing disc 24 to be used for dialing the number of the person being called. Such dialing mechanisms include normally closed switches which are repeatedly opened and closed on the return movement of the disc 24 for sending out electrical impulses, again as generally known in the art of telephone circuits. Extending from the back of the base 21 of the telephone 20 there is a single cable 25 which includes the necessary leads for connection to the transmitter and the receiver which are mounted in opposite ends of the hand set 22. Extending from the side of the base 21, there is a single cable 26 which embodies the leads for connection to the circuits of the telephone company. It is thought that the foregoing discussion of the telephone 20 is sufficient to serve the purposes of the present invention and further reference to the constructional details of the telephone will not be given in this specification as they form no part of the present invention.

The alarm system of the present invention is designed to establish connection with the central office of the telephone company even though the hand set 22 has not been lifted from the base 21 in response to the existence of a predetermined condition within the premises protected by the alarm system. In the first form of the invention, the system is installed to operate as a burglar alarm and in Fig. 1, there is illustrated a portion of the interior of a building 27 having a door 28 pivotally supported within a door frame 29 on hinges 30. The door 28 is provided with the usual knob and lock mechanism 31 for locking the door in a closed position. The building 27 is further provided with a window 32 having the usual frame 33 slidably supporting a lower sash 34 and an upper sash 35.

The alarm system is designed to operate automatically upon unauthorized opening of any door or window of the building 27 to which the system is connected. The alarm system includes a main box 36 in one side of which there is mounted the electrical parts of the system and in the other side of which there is mounted an amplifier 37. The amplifier 37 is constructed to include the usual amplifying circuit 38 and turntable drive motor 39, see Fig. 11. The drive motor 39 is provided for rotating a turntable 40, see Fig. 3, upon which a record 41 is positioned. Resting on the record 41 there is the usual needle 42 of a tone arm 43 which has its pick-up connected in the amplifying circuit 38 of the amplifier. Thus, when the amplifying circuit 38 is energized and the turntable drive motor 39 is operating the message of the record 41 will be played to the operator of the telephone company as will become clear as this description proceeds.

The record 41 has cut thereon a message pertinent to the predetermined condition which must exist for setting the alarm system in operation. With the system constructed as a burglar alarm such message might be as follows:

My name is John Q. Public and I reside at 423 Park Avenue, New York city. My home is being burglarized; please advise the local police.

That message will be continuously recorded on the record, 41. The record being one to operate at 33 or 45 R. P. M. the amplifier will be in operation at least for a full four minutes; affording the telephone operator a sufficient length of time to receive the message even though the circuits of the telephone company are tied up. When the end of the record groove is reached the needle will merely idle in the continuous end groove until the alarm circuit is shut off as will be presently described.

The particular amplifier 37 shown on the drawing is one using flat disc records; however, that is by way of illustration only as the amplifier can be one designed to operate using tapes or wires without departing from the scope of the present invention. Also, such recorder can be designed to operate with a continuous tape or wire so that the recorded message will be continuously repeated an endless number of times until the alarm system is shut off.

The main box 36 of the alarm system has a pivotally mounted cover 44 provided to be lowered over the turntable 40 and the tone arm 43 as known in the art of amplifier construction. The main box 36 has a front wall 45 and a rear wall 46. The rear wall 46 is formed with an opening through which the interior of the side of the box which encloses the electrical parts can be reached. That opening is closed by a pivotally mounted door 47, see Fig. 2, which is maintained in a closed position by a key operated lock 48 to prevent unauthorized entrance into the interior of the box by children and the like. Mounted on the rear wall 46 beneath the bottom edge of the door 47 there are three junction or terminal boxes 49, 50 and 51. Extending from the terminal box 49 there is a cable 52 provided at its other end with a conventional plug 53 for insertion into an outlet receptacle for supplying the required 110 volt A. C. current for operating the alarm system. Extending from the terminal box 50, there is a cable 54 which encloses all of the leads which are connected to the telephone 20, see Figs. 1 and 2. Extending from the terminal box 51 there are cables 55 and 56 connected to the electrical parts mounted on the door frame 29 and the window frame 33.

Figure 11:
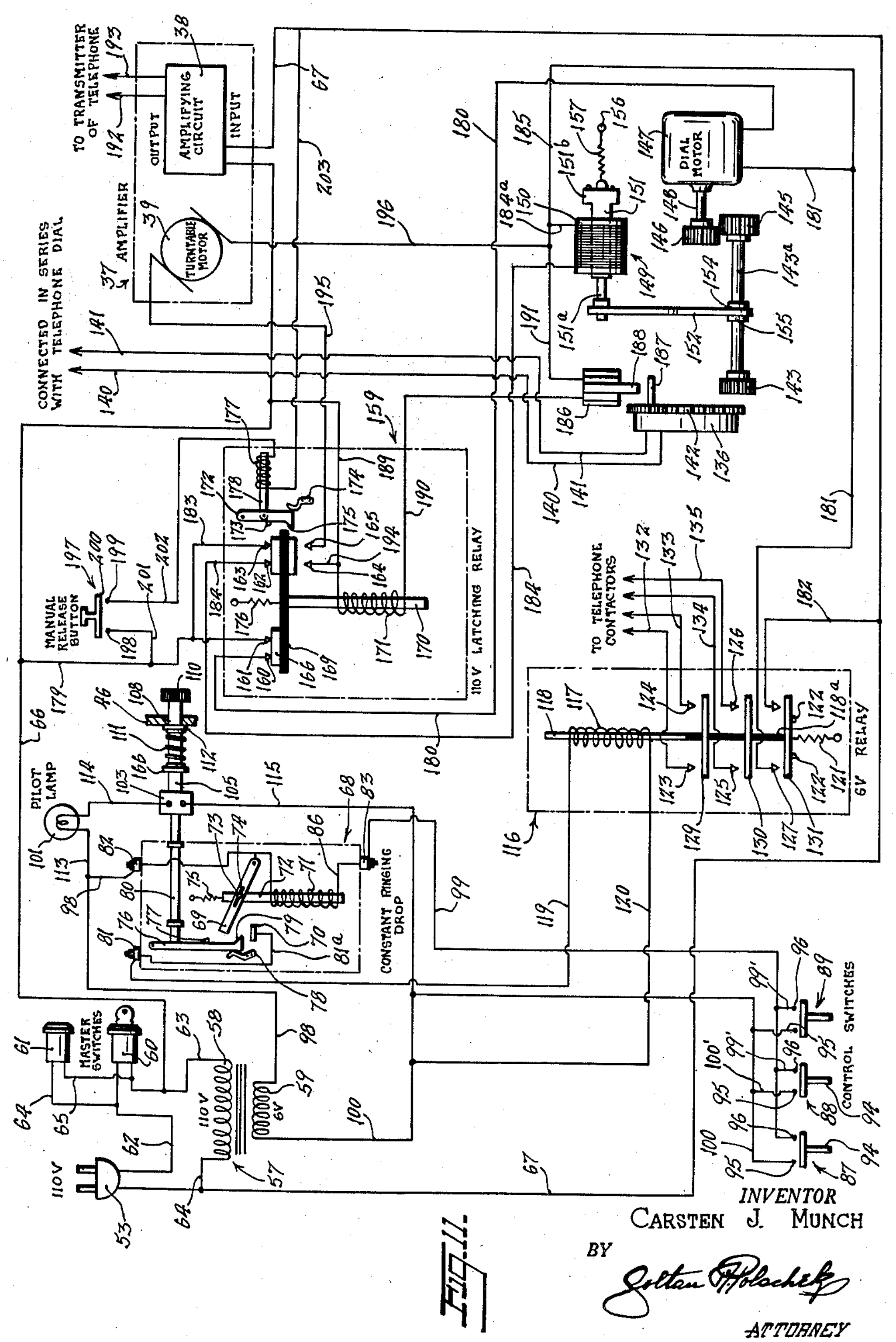
Fig. 11 is a schematic wiring diagram of the alarm system.

Referring now specifically to Fig. 11, it will be noted that the alarm system includes a transformer 57 having a primary winding 58 and a secondary winding 59. The primary winding 58 is connected in a circuit which includes the plug 53 and a pair of parallel connected, key operated master switches 60 and 61. The master switch 60 is mounted through the front wall 45 of the main box 36, see Fig. 1, so that the alarm system can be put in operation from the interior of the building 27 without requiring actual leaving of the premises. The master switch 60 will be used in a home for example and is turned on when the last of the occupants of the home retires for the evening or at such other times when protection of the system is desired. The master switch 61 is exposed at the outside of the building 27 immediately adjacent the door through which the last of the occupants leaves the building, so that the alarm system can be turned on upon leaving the premises. The master switches 60 and 61 are key operated to prevent their being turned on or turned off by unauthorized persons. The circuit which includes the primary winding 58 includes a lead 62 from the plug 53 to the master switch 60 and a lead 63 from the master switch 60 to one side of the primary winding 58. A lead 64 extends from the other side of the primary winding 58 back to the plug 53. The master switch 61 has leads 64 and 65 connected to the leads 62 and 63 in shunt of the master switch 60. Thus when either of the master switches 60 or 61 is turned on the circuit through the primary winding 58 of the transformer will be completed.

The leads 62 and 64 where they extend from the main box 36 are enclosed in the cable 52. Likewise, the leads 64 and 65 where they leave the main box 36, through the terminal box 51, are enclosed in the cable 55, see Fig. 1. It is appreciated, of course, that the master switch 61 could be embodied in the doorlock mechanism 31 so that the mere act of locking the door 28 in its closed position, upon leaving the building 27, would cause the alarm system to be turned on.

The act of turning either of the master switches 60 or 61 to its "on" position will cause 110 volt current to be fed into the amplifying circuit 38 of the amplifier 37 to heat up the tubes of the amplifier to be ready for immediate operation when the alarm system is set in operation. The circuit for so energizing the amplifying circuit 38, includes a lead 66 connected at one end to the lead 63 between the master switch 60 and the primary winding 58 of the transformer 57 and at its other end to the input transformer, not shown, of the amplifying circuit 38. A lead 67 extends from the other side of the input transformer of the amplifying circuit 38 and has its other end connected to the lead 64 between the plug 53 and the primary 58 of the transformer 57. Thus, when either of the master switches 60 or 61 is turned on, the amplifying circuit 38 will be energized to be ready at a moment's notice.

The transformer 57 is a step down transformer and converts the 110 volt current into a six volt current. The reduced current from the secondary winding 59 of the transformer 57 is fed through a constant ringing drop 68. The constant ringing drop 68 includes a switch arm 69 of conductive material arranged to be closed against a fixed contact 70. The constant ringing drop 68 further includes a coil 71 which when energized moves a metallic core 72 to pivot the switch arm 69 to engage the contact 70. The top end of the core 72 is connected to the switch arm 69 by a pin 73 on the core 72 which engages a slot 74 in the switch arm 69 intermediate of its ends. A spring 75 is provided for holding the core 72 in a raised position in which the switch arm 69 will be raised off the contact 70 when no current is flowing in the coil 71.

Mechanism is provided within the constant ringing drop 68 for holding the switch arm 69 down on the contact 70, after having been moved to its operative position, even when no current is flowing in the coil 71 and against the action of the spring 75. That means comprises a pivotally mounted latch arm 76 positioned above the contact 70. The latch arm 76 is held in an operative position against a pin 77 by a leaf spring 78. The bottom end of the latch arm 76 is formed with a cam surface 79 which faces the free end of the latch arm 69. When the core 72 is pulled downward, the switch arm 69 will be pivoted toward the contact 70 passing the cam surface 79. That will cause the latching arm 76 to be pivoted outward against the action of the spring 78 until the free end of the switch arm 69 passes the bottom end of the latch arm 76. The leaf spring 78 will then operate to immediately snap the latch arm 76 back to its starting position holding the switch arm 69 in engagement with the contact 70.

A slidably mounted plunger 80 is provided for pivoting the latch arm 76 against the action of the leaf spring 78 to release the switch arm 69 to be raised off the contact 70 by the spring 75. The plunger 80 is projected from one side of the casing of the constant ringing drop 68 to be manually pressed inward by a novel arrangement to be hereinafter described. The extension of the plunger 80 can be best seen in Figs. 7 and 11.

Exposed on the top of the constant ringing drop 68, there is a pair of terminals 81 and 82 and exposed on the bottom of the same there is a single terminal 83. The terminal 81 is connected to the contact 70 by a lead 81*a*. The terminal 82 is connected to the pivoted end of the switch arm 69 and to one end of the coil 71 by a lead 85. The other end of the coil 71 is connected to the terminal 83 by a lead 86.

Figures 7, 8, 9, 10, 12:
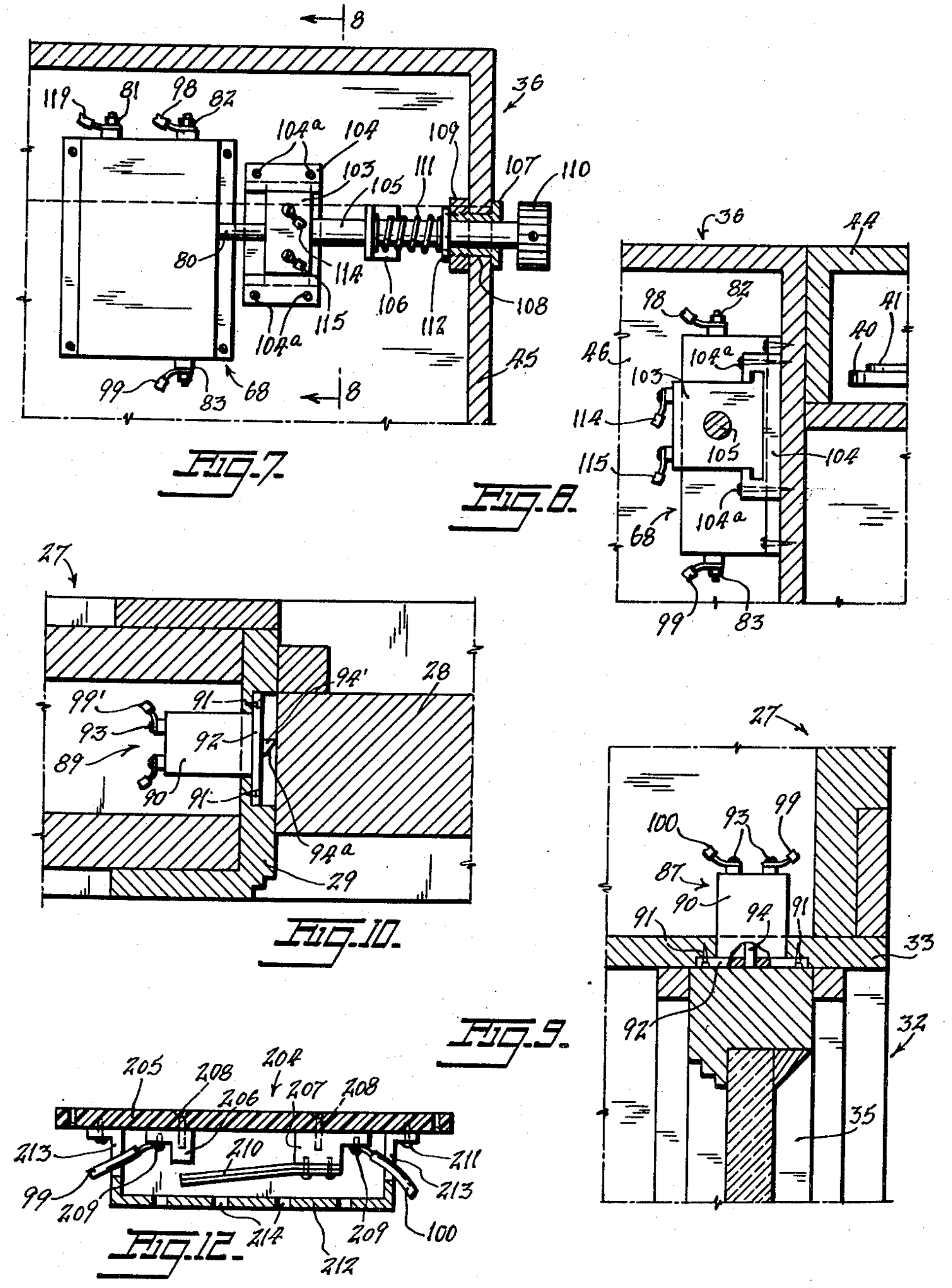
Fig. 7 is a partial vertical sectional view taken on the line 7—7 of Fig. 1.
Fig. 8 is a partial vertical sectional view taken on the line 8—8 of Fig. 7.
Fig. 9 is an enlarged partial vertical sectional view taken on the line 9—9 of Fig. 1.
Fig. 10 is an enlarged partial horizontal sectional view taken on the line 10—10 of Fig. 1.
Fig. 12 is a sectional view of a thermostatic control switch which can be used with the alarm system.

Energization of the coil 71 of the constant ringing drop 68 is controlled by control switches 87, 88 and 89. The control switches 87 and 88 are alike and are mounted on the window frame 33 to be controlled by unauthorized opening of the window sashes 34 and 35. The control switch 89 is mounted on the door frame 29 to be controlled by unauthorized opening of the door 28. Each of the switches 87, 88 and 89 is alike in that each is spring pressed to a closed position in which current will flow through the same. In Fig. 9, there is illustrated the switch 87 controlled by the upper sash 35 of the window 32. The switch 87 includes a casing 90 mounted in position in the window frame 33 by means of screws 91 passed through an external flange 92 of the casing 90. Within the frame 33, the casing 90 is provided with external screws 93 for the connection of the necessary electric leads. Extending from the bottom of the casing 90 there is a spring pressed plunger 94 arranged to be pressed inward by the upper sash 35 when in its fully raised position shown in Fig. 9. If that sash 35 is lowered by an unauthorized person, the plunger 94 will move downward closing the circuit through the control switch 87.

The control switch 88 of the lower sash is like the control switch 87 except that it is mounted on the window frame 33 to have its plunger 94 extend upward to be pressed inward by the lower sash 34 when in its fully lowered position.

The control switch 89 is like the control switches 87 and 88 except for the construction of its plunger 94', see Fig. 10. The control switch 89 is mounted on the door frame 29 to be controlled by opening and closing of the door 28 with relation to the usual door jamb. The plunger 94' of the control switch 89 is provided with a beveled surface 94a facing in the direction in which the door 28 is free to be pivoted. Thus, when the door 28 is closed the free edge of the door will ride on the cam surface 94a and press the plunger 94′ inward holding the control switch 89 in its open position. It is appreciated that the plunger 94′ must be non-rotative so that the cam surface 94a will always be in position to be engaged by the free edge of the door 28.

Like parts of the control switches 87, 88 and 89 are identified on the drawings by the same reference numerals. From Fig. 11, it will be noted that each of the control switches includes a pair of spaced contacts 95 and 96 arranged to be engaged by a contact strip 97 carried by the respective spring plungers 94 or 94′ of the switches.

The circuit for energizing the coil 71 of the constant ringing drop 68 includes a lead 98 from the one side of the secondary winding 59 of the transformer 57 to the terminal 82. Extending from the terminal 83, there is a lead 99 which is connected to the contact 96 of the control switch 87. The other contact 95 of the control switch 87 is connected to the other end of the secondary winding 59 by a lead 100. The contacts 95 and 96 of the control switches 88 and 89 are connected into the circuit by branch leads 99′ and 100′. Thus, the control switches 87, 88 and 89 are connected in parallel in the circuit to shunt one another so that closure of one of those switches is sufficient to energize the coil 71 of the constant ringing drop 68.

In the event an unauthorized person attempts to enter the building 27 by opening the door 28 or one of the sashes 34 or 35 of the window 32, the plunger 94 or 94′ of the respective control switch 87, 88 or 89 will be immediately released causing that switch to move to a closed position. Current will immediately flow from the secondary winding 59 of the transformer 57 through the coil 71 of the constant ringing drop 68 energizing that coil. Energization of the coil 71 will draw on the core 72 against the action of the spring 75 pivoting the switch arm 69 past the latch 76 and into engagement with the contact 70. The action of the switch arm 69 is instantaneous and it will be retained in engagement with the contact 70 by the latch arm 76 even in the event the unauthorized person should immediately reclose the window or the door through which unauthorized entrance was obtained, resetting the respective control switch 87, 88 or 89 shutting off the flow of current through the coil 71 to release its hold on the core 72.

Before continuing with the description of the main parts of the device, means is provided for determining whether current is flowing in the transformer and for providing mechanism for pressing inward on the plunger 80 of the constant ringing drop 68 to pivot the latch arm 76 against the action of the leaf spring 78 to free the switch arm 69. The current flow determining means includes a small six volt pilot lamp 101 which is mounted through the front wall 45 of the main box 36 and which is protected from breakage by a semi-circular hood 102 mounted on the front wall 45 immediately above the lamp 101, see Figs. 1 and 3.

For turning the lamp 101 on and off there is provided a manually operable switch 103. The switch 103 is slidably mounted in a track 104 to move toward and away from the plunger 80, see Figs. 7 and 8. The track 104 is fixedly mounted to an internal wall of the main box 36 by several screws 104a. Extending from the switch 103 there is a rotative stem 105 which can be manually turned first in one direction for turning the switch 103 on and then in the opposite direction for turning the switch off. The stem 105 is rotatively and slidably extended through a bracket 106 and a bushing 107. The bracket 106 is secured to the same internal wall of the main box 36 to which the track 104 is attached. The bushing 107 is extended through a hole 108, see Fig. 7, formed in the front wall 45 of the main box 36. The bushing 107 is retained in position by a nut 109 threaded onto the inner end of the bushing and against the inner face of the front wall 45. Mounted on the outer end of the rotative stem 105, there is a knurled knob 110 by which the stem can be conveniently turned in one direction or the other or by which the stem can be pressed inward.

An expansion spring 111, see Fig. 7, sleeves the stem 105 and operates between the bracket 106 and a collar 112 on the stem for urging the stem axially outward and for in turn moving the switch 103 to a position on the track 104 in which the plunger 80 is fully extended leaving the latch arm 76 to be pivoted to its operative position against the pin 77 by the leaf spring 78. Thus, when the stem 105 is pushed axially inward against the action of the coil spring 111, the switch 103 will be moved along the track 104 to push inward on the plunger 80. Referring to Fig. 11, it will be noted that inward movement of the plunger 80 will pivot the latch arm 76 against the action of the leaf spring 78. The bottom end of the latch arm 76 will be disengaged from the switch arm 69 freeing the switch arm to be raised off the contact 70 by the action of the spring 75.

The circuit for the pilot lamp 101 can be traced from the secondary winding 59 of the transformer 57 along the lead 98 to a lead 113 connected at one end to the lead 98 between the secondary winding 59 and the terminal 82 of the constant ringing drop 68. The other end of the lead 113 is connected to the lamp 101. A lead 114 extends from the other side of the lamp 101 to one side of the pilot lamp switch 103. A third lead 115 from the other side of the switch 103 is connected to the lead 100 between the secondary winding 59 and the control switches, so that the current flows along the lead 100 back to the other side of the secondary winding 59 of the transformer 57. Thus, when the switch 103 is in the "on" position, the pilot lamp 101 will be lit indicating that current is flowing in the transformer 57. Normally, however, the switch 103 is left in an "off" position so that the pilot lamp 101 will not be illuminated all the while one of the master switches 60 and 61 is in the "on" position.

Returning now to the main operation of the alarm system, closing of the switch arm 69 of the constant ringing drop 68 on the contact 70, as described supra, will control the energization of a six volt relay 116 having a coil 117 for moving a core 118 of magnetic material, see Fig. 11. To complete the circuit for energization of the coil 117, a lead 119 extends from the terminal 81 of the constant ringing drop 68 to one side of the coil 117. Extending from the other side of the coil 117, there is a lead 120 connected at its other end to the lead 100 to feed back into the secondary winding 59 of the transformer 57.

The current through the coil 117 of the six volt relay 116 can be traced from the secondary winding 59 along the lead 98 to the terminal 82, the lead 85, the switch arm 69, the contact 70 against which the switch arm is closed, the lead 81a, the terminal 81 and the lead 119 to one side of the coil 117. From the coil 117, the current passes through the lead 120 to the lead 100 and then back to the other side of the secondary winding 59 of the transformer 57.

The relay 116 has all normally open contacts and the energization of the coil 117 raises the core 118 against the action of a spring 121 to close all of its normally open contacts. The spring 121 functions to hold the core 118, when no current is flowing in the coil 117, in a lowered inoperative position against fixed pins 122.

The normally open contacts of the relay 116 comprise three sets of contacts 123 and 124, 125 and 126, and 127 and 128, see Fig. 11. The core 118 of the relay has an end portion 118a of insulation material upon which there is mounted spaced contact strips 129, 130 and 131. When the coil 117 is energized, the contact strip 129 engages the contacts 123 and 124, the contact strip 130 engages the contacts 125 and 126, and the contact strip 131 engages the contacts 127 and 128.

The contacts 123 and 124 and the contacts 125 and 126 are connected in pairs by leads 132, 133, 134 and 135 to the contactors of the switch of the telephone 20 whose operation is controlled by removal of the hand set 22 from the base 21 of the telephone. The leads 132, 133, 134 and 135 are connected to those contactors to shunt that switch of the telephone and establish contact with the central office of the telephone company with the hand set 22 in position on the base 21. That contact is effected by the mere energization of the coil 117 of the relay 116 moving the contact strips 129 and 130 into contact with the pairs of contacts 123 and 124 and 125 and 126. Closing of the contacts 127 and 128 of the relay 116 controls the operation of other parts of the alarm system to be presently described.

Dialing means is provided for dialing the operator once the circuit to the telephone company has been opened by the engagement of the contact strips 129 and 130 with the pairs of contacts 123 and 124 and 125 and 126 of the relay 116. The dialing means is mounted within the main box 36 and is characterized by a dialing mechanism 136 similar in basic construction to the dialing mechanism 23 of the telephone 20. The dialing mechanism 136 is positioned on a support block 137, see Figs. 5 and 6, mounted on the bottom wall of the main box 36. The top of the support block 137 is rounded to be semi-circular so as to mount the dial mechanism 136. The dialing mechanism 136 is retained in position on the support block 137 by means of an inverted U-shaped metal band 138 which extends over the top of the dialing mechanism and which has its free ends secured to the sides of the support block 137 by attaching screws 139.

Internally, the dialing mechanism 136 includes the usual normally closed contacts, not shown, which are to be separated by the operation of the dialing mechanism to send out the proper number of electrical impulses corresponding to the portion of a complete turn of the dialing mechanism. Those normally closed contacts of the dialing mechanism 136 are connected by leads 140 and 141 in series with the normally closed contacts of the dialing mechanism 23 of the telephone 20. Thus, either of the dialing mechanisms 23 or 136 can be used for dialing purposes when contact with the central office has been established.

The dialing mechanism 136 of the alarm system distinguishes from the dialing mechanism 23 of the telephone 20 by the single fact that the usual apertured dialing disc of the dialing mechanism 136 has been replaced by a single large gear 142 of approximately the same diameter as the usual dialing disc. The gear 142 is retained in a starting position by the usual spring mechanism incorporated in such dialing mechanisms and is returned to that starting position, after having been rotated, by that same spring mechanism. The direction of rotation of the gear 142 is indicated by the arrow A on Fig. 6. The gear 142 is retained from making a complete revolution in the direction of the arrow by the usual stops which arrest the turning of the usual dialing disc.

For rotating the gear 142 through that portion of a complete revolution through which it is free to be turned to dial the operator, a small pinion 143 is provided. That small pinion 143 is normally out of mesh with the gear 142 so that the gear 142 is free at all times to be turned back to its starting position by the spring mechanism of the dialing mechanism 136. The small pinion 143 is mounted on one end of a shaft 143a which is rotatively and axially slidably supported in spaced bearing brackets 144 mounted within the main box 36. The opposite end of the shaft 143a carries a gear 145 which is in mesh with a gear 146 driven by a dial motor 147. The dial motor 147 is fixedly mounted on the bottom wall of the main box 36 and has the gear 146 mounted on its driven shaft 148. The gear 145 is of sufficient length to retain engagement with the gear 146 in all axial shifted positions of the shaft 143a. Thus, it is appreciated that when the motor 147 is energized the pinion 143 will be turned in the proper direction to turn the gear 142 in the direction of the arrow A.

Simultaneous with energization of the dial motor 147, means is provided for shifting the shaft 143a axially in a direction to engage the small pinion 143 with the gear 142. That shaft shifting means comprises a solenoid 149, see Figs. 4 to 6 and 11. The solenoid 149 includes a coil 150 which is energized. The end of the core 151 facing the direction in which the core moves when the coil 150 is energized, is formed with an axially extended reduced portion 151a to which one end of an elongated arm 152 is adjustably secured by an adjustment screw 153, see Fig. 4. The opposite end of the arm 152 is bifurcated and engaged with a peripheral groove 154 formed about a bushing 155 secured to the shaft 143a between the bearing brackets 144. The engagement of the bifurcated end of the arm 152 with the groove 154 leaves the shaft 143a free to turn at all times. Thus, it is apparent that when the coil 150 of the solenoid 149 is energized the shaft 143a will be moved axially to move the small pinion 143 into meshing engagement with the gear 142 to rotate the same. Movement of the core 151 by the coil 150 is arrested by the enlarged portion 151b formed on the core for striking the adjacent end of the coil 150 when the core 151 has been moved a sufficient distance to bring the pinion 143 into engagement with the gear 142.

Operating between the enlarged portion 151b of the core 151 and a fixed pin 156, there is a contraction spring 157 for drawing back on the core 151 when the coil 150 is deenergized to in turn move the shaft 143a back to its starting position. Return movement of the shaft 143a is stopped by a collar 158 formed on the shaft 143a for striking one of the bearing brackets 144.

Energization of the dial motor 147 and the coil 150 of the solenoid 149 is effected through a 110 volt latching relay 159, see Fig. 11, when the contact strip 131 of the six volt relay 116 engages the contacts 127 and 128. The 110 volt latching relay 159 has two sets of normally closed contacts 160 and 161 and 162 and 163 and one set of normally open contacts 164 and 165. The contacts 160 and 161 are normally closed by a contact strip 166 and the contacts 162 and 163 are normally closed by a contact strip 167. The contacts 164 and 165, which are normally open, are arranged to be closed by a contact strip 168. The contact strips 166, 167 and 168 are mounted on the opposed faces of the cross arm 169 of insulation material carried by a core 170 of the latching relay. A coil 171 engages the core 170 to move the core axially in one direction to similarly move the cross arm 169 to space the contact strips 166 and 167 from the sets of contacts 160 and 161 and 162 and 163 opening the same. That movement will also move the contact strip 168 into engagement with the contacts 164 and 165 closing the same.

Means is provided for holding the core 170 and cross arm 169 in the shifted position in which the contact strip 168 will be in engagement with the contacts 164 and 165 when the current in the coil 171 is stopped. That holding means comprises a pivotally mounted latch arm 172 which is urged into an operative position against a stop pin 173 by a small fixedly mounted leaf spring 174. The free end of the latch arm 172 has a cam surface 175 facing the adjacent end of the cross arm 169. Thus, when the cross arm 169 is moved from its normal position by energization of the coil 171, the end of the cross arm will ride over the cam surface 175 pivoting the latch arm 172 outward against the action of the leaf spring 174. When the cross arm 169 passes the free end of the latch arm 172, the leaf spring 174 will immediately snap the latch arm back against the stop pin 173 and into engagement with the adjacent face of the cross arm holding it in a position in which the contact strip 168 will be in engagement with the contacts 164 and 165. The cross arm 169 and the core 170 are retained in a normal position in which the contact strips 166 and 167 are in engagement with the sets of contacts 160 and 161 and 162 and 163 by a contraction spring 176.

Movement of the latch arm 172 to release the cross arm 169 to be returned to its starting position by the spring 176 is controlled by a solenoid having a coil 177 and a core 178. The core 178 has one end secured to the pivoted latch arm 172 intermediate of its ends so that the moment the coil 177 is energized the core 178 will be moved axially pivoting the latch arm 172 out of engagement with the cross arm 169 and free the same.

The 110 volt circuit for energizing the dial motor 147 can be traced from the plug 53 along the lead 62 through either of the master switches 60 and 61 and through the lead 66. A lead 179 is connected at one end to the lead 66 and to the contact 161 of the latching relay 159. Extending from the lead 160, there is a lead 180 which is in turn connected to one side of the dial motor 147. From the other side of the dial motor 147, a lead 181 is connected to the contact 127 of the six volt relay 116. When the contact strip 131 is closed against the contacts 127 and 128 by energization of the coil 117 of the relay 116, the current passes from the contact 127 through the contact strip 131 to the contact 128. A lead 182 extends from the contact 128 and is connected to the lead 67 between the plug 53 and the amplifying circuit 38 of the amplifier. Thus the current for the dial motor 147 flows back to the plug 53 along the leads 182 and 67.

The 110 volt circuit for energizing the coil 150 of the solenoid 149 simultaneous with energization of the dial motor 147 traced from the plug 53, through the master switch 60 or 61 and then along the lead 66 into the lead 179. From the lead 179, the lead 183 is connected to the contact 163 of the latching relay 159 so that the current flows through the contact strip 167 into the contact 162. From the contact 162, a lead 184 carries the current into one side of the coil 150. A lead 185 extends from the other side of the coil 150 and connects with the lead 181 between the dial motor 147 and the contact 127 of the relay 116. Thus, the current from the coil 150 flows along the lead 184ª, the lead 181 into the contact 127. When the contact strip 131 is closed against the contacts 127 and 128, the current flows from the contact 127 through the contact strip 131 to the contact 128, along the lead 182 and the lead 67 back to the plug 53.

Thus, it is apparent that when the contact strip 131 is closed against the contacts 127 and 128 by energization of the coil 117 of the relay 116 both the dial motor 147 and the solenoid 149 will be energized to cause the gear 142 of the dialing mechanism 136 to be turned through that portion of a complete revolution that the gear is free to be turned to dial the operator.

Means are provided, controlled by the gear 142 as it approaches the end of that portion of a complete revolution that it is free to be turned through, for de-energizing the solenoid 149 and the dial motor 147 to free the gear 142 to be turned back to its starting position by the spring mechanism contained within the dialing mechanism 136. That de-energizing means comprises a snap action switch 186 which can be any normally open microswitch mounted within the main box 35 closely adjacent the gear 142. Projecting from the face of the gear 142 there is a pin 187. The switch 186 is provided with a flexible blade 188 projected into the path of the pin 187 to be engaged by the pin to momentarily close the normally open switch 186 to pass electrical current. The pin 187 is so mounted on the gear 142 with relation to the free end of the blade 188, that the pin will not contact the blade 188 until the gear 142 has nearly completed that portion of the complete revolution through which the gear is free to be turned.

It is the normally open switch 186 which controls energization of the coil 171 of the latching relay 159 to move the core 170 and the cross arm 169 to move the contact strips 166 and 167 out of engagement with the contacts 160 and 161 and 162 and 163 to de-energize the dial motor 147 and the solenoid 149. The circuit for the coil 171 can be traced from the plug 53 along the lead 62 through either the master switch 60 or 61 and along the lead 66. Extended from the lead 66, there is a lead 189 which feeds into one side of the coil 171. From the other side of the coil 171, a lead 190 connects to one side of the switch 186. A lead 191 extends from the other side of the switch 186 and connects to the lead 185 between the solenoid 149 and the lead 181. Thus, the current can be traced from the other side of the switch 186 along the lead 191, the lead 185, the lead 181 and back to the plug 53 the same as for the dial motor 147 and the solenoid 149. It being appreciated, of course, that the contact strip 131 of the relay 116 must be in engagement with the contacts 127 and 128 before the closing of the normally open switch 186 can energize the coil 171 of the latching relay 159. Engagement of the pin 187 carried by the gear 142 with the blade 188 of the normally open switch 186 will cause the switch to be momentarily closed to energize the coil 171 of the latching relay 159. The action will be to immediately move the contact strips 166 and 167 away from the contacts 160 and 161 and 162 and 163 to de-energize the dial motor 147 and the solenoid 149. Immediately, the small pinion 143 will move out of engagement with the gear 142 and that gear will be returned to its starting position completing the dialing of the operator. Notwithstanding that the pin 187 moves away from the blade 188 releasing the switch 186 to snap back to its open position de-energizing the coil 171, the cross arm 166 of the latching relay 159 will be retained in its moved position in which the contact strip 168 closed the contacts 164 and 165 by the latching arm 172 as previously described.

Engagement of the contact strip 168 with the contacts 164 and 165 will cause the turntable drive motor 39 of the amplifier 37 to be energized to turn the turntable 40 and cause the continuously recorded message of the record 41 to be played through the amplifying circuit 38 of the amplifier 37 and through the transmitter of the telephone 20 to the operator of the central office of the telephone company. To accomplish that, the output transformer, not shown, of the amplifying circuit 38 of the amplifier 37 is connected by leads 192 and 193 to the transmitter of the telephone 20.

The circuit for energizing the turntable drive motor 39 can be traced from the plug 53 along the lead 62 through either of the master switches 60 and 61, the lead 66, the lead 189 and a lead 194 to the contact 164 of the latching relay 159. When the contact strip 168 is closed against the contacts 164 and 165, the current flows from the contact 164 through the contact strip 168 into the contact 165. A lead 195 extends from the contact 165 to one side of the turntable motor 39. Extending from the other side of the turntable motor 39, there is another lead 196 which is connected to the lead 185 at its junction with the lead 191. Thus, the current from the other side of the motor 39 flows along the lead 196 into the lead 185 and then back to other side of the plug 53, the same as for the dial motor 147 and the solenoid 149. Again, for energization of the turntable motor 39 to be effected, it is necessary that the contact strip 131 of the relay 116 be closed against the contacts 127 and 128 as previously described.

When the turntable motor 39 is energized the recorded message will be repeated to the telephone company operator over and over again until the police arrive to apprehend the person making an illegal entry and to shut off the alarm system. Following the apprehending of the intruder, the police can quickly shut off the alarm system by turning "off" the one of the master switches 60 or 61 which is in the "on" position, if they have a key supplied by the tenant of the building. However, if no key is available, the entire alarm circuit can be disabled by first reclosing the open window or door through which the intruder passed to reopen the respective control switch 87, 88 or 89. Then, the knob 110 is pushed inward to slide the switch 103 to push inward on the plunger 80 of the constant ringing drop 68. Inward movement of the plunger 80 will pivot the latch arm 76 to free the switch arm 69 to be raised off the contact 70. Immediately, the circuit, through the coil 117 of the relay 116, will be broken de-energizing the relay 116. De-energization of the relay 116 will free the contact strips 129 and 130 to be moved away from the pairs of contacts 123 and 124 and 125 and 126 breaking the circuit to the telephone company. Simultaneously, the contact strip 131 will move away from the contacts 127 and 128 breaking the circuits to the turntable drive motor 39 and to the coil 171 of the latching relay. The alarm system will then be disabled.

When the circuit to the coil 171 of the latching relay 159 is broken the core 170 is not moved back to its starting position by the spring 176 because of the action of the pivotally mounted latching arm 172. To free the core 170 and in turn the cross arm 169 to be moved back to their starting position in which the contact strips 166 and 167 are engaged with the pairs of contacts 160 and 161 and 162 and 163, it is necessary to energize the coil 177. Energization of the coil 177 is effected by a release button 197 which is mounted through the front wall 45 of the main box 36, see Fig. 1. As shown in Fig. 11, the release button 197 is a conventional spring pressed push button having normally open contacts 198 and 199 arranged to be bridged by the contact strip 200 when the release button 197 is manually pushed inward.

The circuit for the coil 177 can be traced from the plug 53 along the lead 62 through either of the master switches 60 or 61, the lead 63, the lead 66 and the lead 179. From the lead 179, a lead 201 is connected to the contact 198. When the contact strip 200 is engaged with the contacts 198 and 199, the current will flow from the contact 198 through the contact strip 200 to the contact 199. A lead 202 is connected to the contact 199 and has its other end connected to the coil 177 at one end thereof. Extending from the other end of the coil 177, there is a lead 203 which is connected to the lead 67 between the amplifying circuit 38 and the plug 53. Thus, the current flows from the other side of the coil 177 through the lead 203 and the lead 67 back to the other side of the plug 53. Energization of the coil 177, of course, requires that one or the other of the master switches 60 or 61 be in the "on" position. When the release button 197 is pushed inward, the coil 177 will be energized to draw on the core 178 and pivot the latch arm 172 against the action of the leaf spring 174 to free the cross arm 169 and core 170 to be moved back to their starting position by the spring 176. When the push button 197 is again released, the coil 177 will be de-energized freeing the latch arm 172 to be returned to its starting position against the stop pin 173 by the leaf spring 174.

The leads 132, 133, 134, 135, 140, 141, 192 and 193 where the exit from the main box 36 through the terminal box 50 are embodied in the cable 54 which carries those leads to the interior of the telephone 20 where they are connected to their respective parts of the telephone circuit.

It is thought that the entire operation of the alarm system for advising the telephone operator of the attempt at burglary and the request that the police be dispatched will be apparent from the foregoing description without further explanation. From the description, it is apparent that the present invention provides a novel alarm system which is completely automatic in its operation and which in no way interferes with normal operation of the telephone 20 regardless of whether the alarm circuit is turned on or not.

In Fig. 12, there is illustrated a thermostatically operated switch 204 which can be substituted together with a number of like switches in the alarm system described in connection with Figs. 1 to 11, in place of the control switches 87, 88 and 89 for converting the system into a fire alarm system.

The thermostatic switch 204 includes a base 205 of insulation material upon which spaced metallic contacts 206 and 207 are mounted by means of attaching screws 208. The ends of the leads 99 and 100 which control energization of the coil 71 of the constant ringing drop 68 are connected to the contacts 206 and 207 by means of screws 209. Secured to the contact 207, there is a bi-metallic strip 210 which has its other end spaced from the contact 207. However, when the temperature within the building 27 rises excessively, as when a fire breaks out, the bi-metallic strip 210 will flex into engagement with the contact 207 and complete the circuit to the coil 71 of the constant ringing drop 68 setting the alarm system in operation exactly as described in connection with the control switches 87, 88 and 89.

The contacts 206 and 207 and the bi-metallic strip 210 are protected by a cover 212 which is secured to the base 205 by several removable screws 211. The ends of the cover 212 are formed with slots 213 through which the leads 99 and 100 extend permitting the cover 212 to be mounted in position even when those leads are connected to the contacts 206 and 207. The main wall of the cover 212 is formed with perforations 214 for permitting a free circulation of air about the bi-metallic strip 210.

When the alarm system is functioning as a fire alarm system, the record 41 will carry a different continuously recorded message from that described in connection with the first form of the invention. The message of the record 41 for the fire alarm system could be as follows:

My name is John Q. Public and I reside at 423 Park Avenue, New York city. My home is on fire; please advise the fire department.

In all other respects, the operation and construction of the alarm system when functioning as a fire alarm system is exactly as described in connection with Figs. 1 to 11 when the system is functioning as a burglar alarm system and like reference numerals are used throughout to identify like parts.

From the foregoing description, it is apparent that the present invention proposes completely automatic alarm system which can be used to afford complete protection against burglars or fires either while the occupant of the building is in the building or during his absence. The invention has been described for use in a home, but it is appreciated that the alarm system can be used to afford similar protection in factories, warehouses, banks, hotels, hospitals and similar institutions.

It is to be understood that this device can operate on normally closed or open control circuits and may be used in connection with any type of doors, windows, safes, vaults, closets and at any other place for safekeeping valuables.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. An alarm system for connection to a telephone having a dial mechanism, a transmitter, and a switch for controlling connection of the telephone with a central office when the hand set of the telephone is lifted comprising a step-down transformer, said transformer having a primary winding and a secondary winding, said primary winding being connected to a household source of power, a recording unit, said recording unit including an amplifying circuit having an input and an output, the input of said amplifying circuit being connected to said household source of power in parallel with the primary winding of said transformer, the output of said amplifying circuit being connected to the transmitter of the telephone, said recording unit further including a drive motor, and means operable by said drive motor for transmitting a recorded message to said amplifying circuit, a first coil connected in series with said secondary winding of said transformer, a first core located within said first coil, a first switch connected to said first core, spring means for normally maintaining said switch in an open position, said first core being adapted to move longitudinally through said first coil when the latter is current activated and to close said first switch, a plurality of control switches connecting said first coil with said secondary winding of said transformer, said control switches being connected in parallel with each other whereby closing any one of said switches will current-activate said first coil, a second coil connected in series with said secondary winding of said transformer and said first switch, a second core located within said second coil, a pair of switches connected to said second core, second spring means for normally maintaining said pair of switches in an open position, said second core being adapted to move longitudinally through said second coil when the latter is current-activated and to close said pair of switches, said pair of switches being connected in shunt of the switch of the telephone whereby to establish contact with the central office without lifting the handset, a third switch connected to said second core and adapted to be maintained in an open position by said second spring means, dial means including a dial mechanism connected in series with the dial mechanism of the telephone for dialing the operator when contact is established with the central office by said pair of switches, said second core being further adapted to close said third switch when said second coil is current-activated, and means operable by the closing of said third switch for first operating said dial means and then operating said drive motor to transmit said recorded message to the operator through the transmitter of the telephone.

2. An alarm system for connection to a telephone having a dial mechanism, a transmitter, and a switch for controlling connection of the telephone with a central office when the hand set of the telephone is lifted comprising a step-down transformer, said transformer having a primary winding and a secondary winding, said primary winding being connected to a household source of power, a recording unit, said recording unit including an amplifying circuit having an input and an output, the input of said amplifying circuit being connected to said household source of power in parallel with the primary winding of said transformer, the output of said amplifying circuit being connected to the transmitter of the telephone, said recording unit further including a drive motor, and means operable by said drive motor for transmitting a recorded message to said amplifying circuit, a first coil connected in series with said secondary winding of said transformer, a first core located within said first coil, a first switch connected to said first core, spring means for normally maintaining said switch in an open position, said first core being adapted to move longitudinally through said first coil when the latter is current activated and to close said first switch, a plurality of control switches connecting said first coil with said secondary winding of said transformer, said control switches being connected in parallel with each other whereby closing any one of said switches will current-activate said first coil, a second coil connected in series with said secondary winding of said transformer and said first switch, a second core located within said second coil, a pair of switches connected to said second core, second spring means for normally maintaining said pair of switches in an open position, said second core being adapted to move longitudinally through said second coil when the latter is current-activated and to close said pair of switches, said pair of switches being connected in shunt of the switch of the telephone whereby to establish contact with the central office without lifting the handset, a third switch connected to said second core and adapted to be maintained in an open position by said second spring means, dial means including a dial mechanism connected in series with the dial mechanism of the telephone for dialing the operator when contact is established with the central office by said pair of switches, said second core being further adapted to close said third switch when said second coil is current-activated, and means operable by the closing of said third switch for first operating said dial means and then operating said drive motor to transmit said recorded message to the operator through the transmitter of the telephone, and a master switch connecting said primary winding of said transformer and said input of said amplifying circuit to said household source of power whereby to control energization of said transformer and said amplifying circuit, and a second master switch connected in shunt of said first master switch, said master switches being key-operated.

3. An alarm system for connection to a telephone having a dial mechanism, a transmitter, and a switch for controlling connection of the telephone with a central office when the hand set of the telephone is lifted comprising a step-down transformer, said transformer having a primary winding and a secondary winding, said primary winding being connected to a household source of power, a recording unit, said recording unit including an amplifying circuit having an input and an output, the input of said amplifying circuit being connected to said household source of power in parallel with the primary winding of said transformer, the output of said amplifying circuit being connected to the transmitter of the telephone, said recording unit further including a drive motor, and means operable by said drive motor for transmitting a recorded message to said amplifying circuit, a first coil connected in series with said secondary winding of said transformer, a first core located within said first coil, a first switch connected to said first core, spring means for normally maintaining said switch in an open position, said first core being adapted to move longitudinally through said first coil when the latter is current activated and to close said first switch, a plurality of control switches connecting said first coil with said secondary winding of said transformer, said control switches being connected in parallel with each other whereby closing any one of said switches will current-activate said first coil, a second coil connected in series with said secondary winding of said transformer and said first switch, a second core located within said second coil, a pair of switches connected to said second core, second spring means for normally maintaining said pair of switches in an open position, said second core being adapted to move longitudinally through said second coil when the latter is current-activated and to close said pair of switches, said pair of switches being connected in shunt of the switch of the telephone whereby to establish contact with the central office without lifting the handset, a third switch connected to said second core and adapted to be maintained in an open position by said second spring means, dial means including a dial mechanism connected in series with the dial mechanism of the telephone for dialing the operator when contact is established with the central office by said pair of switches, said second core being further adapted to close said third switch when said second coil is current-activated, and means operable by the closing of said third switch for first operating said dial means and then operating said drive motor to transmit said recorded message to the operator through the transmitter of the telephone, and means for holding said first switch in closed position even when said control switches are reopened and current is no longer flowing in said first coil, and release means for said holding means including a slidably mounted plunger in operative engagement with said holding means, a pilot lamp connected in series with said secondary winding of said transformer, a pilot lamp switch connecting said pilot lamp to said secondary winding, said switch being slidably mounted at the free end of said slidably mounted plunger of said release means, and means for moving said pilot lamp switch to push inward on said plunger and operate said release means to free said first switch, said last mentioned means being adapted to open and close said pilot lamp switch.

4. An alarm system for connection to a telephone having a dial mechanism, a transmitter, and a switch for controlling connection of the telephone with a central office when the hand set of the telephone is lifted comprising a step-down transformer, said transformer having a primary winding and a secondary winding, said primary winding being connected to a household source of power, a recording unit, said recording unit including an amplifying circuit having an input and an output, the input of said amplifying circuit being connected to said household source of power in parallel with the primary winding of said transformer, the output of said amplifying circuit being connected to the transmitter of the telephone, said recording unit further including a drive motor, and means operable by said drive motor for transmitting a recorded message to said amplifying circuit, a first coil connected in series with said secondary winding of said transformer, a first core located within said first coil, a first switch connected to said first core, spring means for normally maintaining said switch in an open position, said first core being adapted to move longitudinally through said first coil when the latter is current-activated and to close said first switch, a plurality of control switches connecting said first coil with said secondary winding of said transformer, said control switches being connected in parallel with each other whereby closing any one of said switches will current-activate said first coil, a second coil connected in series with said secondary winding of said transformer and said first switch, a second core located within said second coil, a pair of switches connected to said second core, second spring means for normally maintaining said pair of switches in an open position, said second core being adapted to move longitudinally through said second coil when the latter is current-activated and to close said pair of switches, said pair of switches being connected in shunt of the switch of the telephone whereby to establish contact with the central office without lifting the handset, a third switch connected to said second core and adapted to be maintained in an open position by said second spring means, dial means including a dial mechanism connected in series with the dial mechanism of the telephone for dialing the operator when contact is established with the central office by said pair of switches, said second core being further adapted to close said third switch when said second coil is current-activated, and means operable by the closing of said third switch for first operating said dial means and then operating said drive motor to transmit said recorded message to the operator through the transmitter of the telephone, a turnable gear secured to said dial mechanism of said dial means, a dial motor, and a small pinion gear driven by said motor and adapted to mesh with said turnable gear whereby to operate said dial mechanism to dial the operator, said small pinion gear being normally out of mesh with said turnable gear whereby said turnable gear is free to be turned back to its starting position, and means for moving said small pinion gear into engagement with said turnable gear including a solenoid, said means operable by the closing of said third switch including a latching relay having two sets of normally closed contacts through which said dial motor and said solenoid are current-activated when said third switch is closed, said latching relay further having a set of normally open contacts controlling operation of said drive motor, a third coil connected in series with said third switch, a third core located within said third coil, a cross bar connected to said third core, said normally closed contacts and said normally open contacts being in operative engagement with said cross bar, said third core being adapted to move longitudinally through said third coil when the latter is current-activated to move said cross bar and open said normally closed contacts and close said normally open contacts, a normally open snap-switch connected in series with said third coil, and means controlled by said turnable gear of said dial mechanism for momentarily closing said normally open snap-switch whereby to current-activate said third coil.

5. An alarm system for connection to a telephone having a dial mechanism, a transmitter, and a switch for controlling connection of the telephone with a central office when the hand set of the telephone is lifted comprising a step-down transformer, said transformer having a primary winding and a secondary winding, said primary winding being connected to a household source of power, a recording unit, said recording unit including an amplifying circuit having an input and an output, the input of said amplifying circuit being connected to said household source of power in parallel with the primary winding of said transformer, the output of said amplifying circuit being connected to the transmitter of the telephone, said recording unit further including a drive motor, and means operable by said drive motor for transmitting a recorded message to said amplifying circuit, a first coil connected in series with said secondary winding of said transformer, a first core located within said first coil, a first switch connected to said first core, spring means for normally maintaining said switch in an open position, said first core being adapted to move longitudinally through said first coil when the latter is current-activated and to close said first switch, a plurality of control switches connecting said first coil with said secondary winding of said transformer, said control switches being connected in parallel with each other whereby closing any one of said switches will current-activate said first coil, a second coil connected in series with said secondary winding of said transformer and said first switch, a second core located within said second coil, a pair of switches connected to said second core, second spring means for normally maintaining said pair of switches in an open position, said second core being adapted to move longitudinally through said second coil when the latter is current-activated and to close said pair of switches, said pair of switches being connected in shunt of the switch of the telephone whereby to establish contact with the central office without lifting the handset, a third switch connected to said second core and adapted to be maintained in an open position by said second spring means, dial means including a dial mechanism connected in series with the dial mechanism of the telephone for dialing the operator when contact is established with the central office by said pair of switches, said second core being further adapted to close said third switch when said second coil is current-activated, and means operable by the closing of said third switch for first operating said dial means and then operating said drive motor to transmit said recorded message to the operator through the transmitter of the telephone, spring pressed plungers carried by said control switches and being of the type to normally close said switches, said switches being mounted to be held in the open position by a closed door or window pressing said plungers, said control switches being normally open, thermostatically controlled switches arranged to be closed by an excessive raising of the temperature of the air surrounding said switches.

CARSTEN J. MUNCH.

References Cited in the file of this patent

UNITED STATES PATENTS

| Number | Name | Date |
|---|---|---|
| 1,614,275 | Bruhn | Jan. 11, 1927 |
| 1,976,296 | Resnick | Oct. 9, 1934 |
| 2,099,913 | Tuscher et al. | Nov. 23, 1937 |
| 2,161,525 | Mountstephen | June 6, 1939 |
| 2,469,278 | Sears | May 3, 1949 |
| 2,479,621 | Jackson | Aug. 23, 1949 |
| 2,498,613 | Talbot | Feb. 21, 1950 |